United States Patent [19]
Greenwood

[11] Patent Number: 5,820,513
[45] Date of Patent: Oct. 13, 1998

[54] METHOD OF CONTROLLING VEHICULAR DRIVELINES INCLUDING A CONTINUOUSLY VARIABLE TRANSMISSION

[75] Inventor: Christopher John Greenwood, Preston, England

[73] Assignee: Torotrak (Development) Limited, London, England

[21] Appl. No.: 624,404

[22] PCT Filed: Sep. 22, 1994

[86] PCT No.: PCT/GB94/02055

§ 371 Date: Mar. 29, 1996

§ 102(e) Date: Mar. 29, 1996

[87] PCT Pub. No.: WO95/09996

PCT Pub. Date: Apr. 13, 1995

[30] Foreign Application Priority Data

Oct. 1, 1993 [GB] United Kingdom .................. 9320241

[51] Int. Cl.⁶ ...................................................... F16H 61/38
[52] U.S. Cl. ............................................. 477/43; 477/46
[58] Field of Search .................................. 477/43–49, 37

[56] References Cited

U.S. PATENT DOCUMENTS

| | | |
|---|---|---|
| 4,526,557 | 7/1985 | Tanaka et al. . |
| 4,543,077 | 9/1985 | Yamamuro et al. . |
| 4,579,021 | 4/1986 | Yamamuro et al. . |
| 4,612,828 | 9/1986 | Ide et al. ............................... 477/46 X |
| 4,651,595 | 3/1987 | Miyawaki .................................. 477/48 |
| 4,656,587 | 4/1987 | Osanai et al. . |
| 4,659,321 | 4/1987 | Miyawaki ............................. 477/48 X |
| 4,704,683 | 11/1987 | Osanai . |
| 4,764,155 | 8/1988 | Kumura et al. ............................ 474/17 |
| 4,782,934 | 11/1988 | Takano et al. ......................... 477/49 X |
| 4,793,217 | 12/1988 | Morisawa et al. ..................... 477/48 X |
| 4,836,056 | 6/1989 | Nakawaki et al. ......................... 477/43 |
| 5,136,891 | 8/1992 | Nakano .................................. 74/190.5 |
| 5,144,850 | 9/1992 | Hibi ......................................... 74/200 |
| 5,187,995 | 2/1993 | Nakano ..................................... 476/10 |
| 5,286,240 | 2/1994 | Kobayashi ................................ 476/10 |
| 5,439,424 | 8/1995 | Sawada et al. ....................... 477/48 X |

FOREIGN PATENT DOCUMENTS

| | | |
|---|---|---|
| 0 217 221 | 4/1987 | European Pat. Off. . |
| 0217221 | 4/1987 | European Pat. Off. . |
| 0 323 174 | 7/1989 | European Pat. Off. . |
| 61-136052 | 12/1984 | Japan . |
| 1 525 861 | 9/1978 | United Kingdom . |
| 1525861 | 9/1978 | United Kingdom . |
| WO 93/21031 | 10/1993 | WIPO . |

*Primary Examiner*—Khoi Q. Ta
*Attorney, Agent, or Firm*—Davis and Bujold

[57] ABSTRACT

A method of controlling a vehicle driveline including an engine, a continuously variable ratio transmission (CVT) and a final drive in which over a working range of engine speed, the engine is constrained to work to a performance map correlating each value of engine speed to a particular value of engine torque wherein a demand by a driver for a increase in vehicle speed initiates a quick increase in engine speed to a predetermined engage speed without any substantial rise in the final drive speed and then increasing both engine speed and drive speed by a predetermined function until a selected engine speed limit is reached which is commensurate with the driver's demand, and finally maintaining the selected engine speed limit despite further changes in the final drive speed whereby the ratio range of the CVT is extended by providing two regimes of operation with a synchronous ratio between those regimes and the predetermined function is graphically represented as a straight line slope which corresponds to the slope the synchronous ratio. The invention also relates to a driveline controlled by the method.

6 Claims, 3 Drawing Sheets ically, and as shown in FIG. 1,
METHOD OF CONTROLLING VEHICULAR DRIVELINES INCLUDING A CONTINUOUSLY VARIABLE TRANSMISSION

FIELD OF THE INVENTION

This invention relates to vehicular drivelines including a continuously-variable-ratio transmission, or CVT, the input of which is connected to an engine or other prime mover, and the rotary output of which will be referred to as the final drive.

While the invention is applicable to boats, aircraft, railed and other vehicles in general, it applies particularly to drivelines for automobile vehicles, in which the final drive is connected to the driven wheel or wheels. And while the invention is also applicable to vehicular drivelines including other types of CVT, for instance those of belt-driven, Kopp, or Beier type, and in which the ratio-varying element may be directly and mechanically controlled to determine the instantaneous ratio.

The invention applies particularly to CVTs of the toroidal-race rolling-traction type in which there is no such direct mechanical control upon the rollers. Instead the angular setting to which they settle, and thus the ratio that they transmit, is determined by a balance between the resultant torque to which they are subjected, and the operating force applied to the carriages in which they are mounted. Such toroidal-race CVTs are now known in the art as being of "torque-controlled" type, and recent examples are described for instance in Patents GB-B-2227287 and GB-B-0356102.

It is also now well understood in the art to control such drivelines so that the engine performs at all times in conformity with an electronic "map" constructed to optimise efficiency in some form. FIG. 1 of the accompanying drawings is a typical graph in which the y-axis represents engine torque T and the x-axis engine speed N, with the hyperbolae 1 indicating lines of constant power. Ordinates 2 and 3 indicate idling and maximum engine speeds respectively. Function 4 represents the maximum torque of which the engine is capable over its full range of working speeds. Function 5 represents the preferred and predetermined "control line", to which the engine is programmed to work when under power demand, to achieve optimum performance according to a chosen criterion. That criterion may for instance be optimum emission characteristics, or least knock. With sophisticated control systems, an engine can be programmed to work to alternative control lines from which the driver can select. Typically, and as shown in FIG. 1, function 5 is chosen to achieve maximum power per unit of fuel consumed. Function 8 indicates the typical correlation of T and N when demand is withdrawn and the engine is over-running.

BRIEF DESCRIPTION OF THE DRAWING(S)

The invention will now be described, by way of example, with reference to the accompanying drawings, in which.

DESCRIPTION OF THE PREFERRED EMBODIMENT(S)

Figure 1:
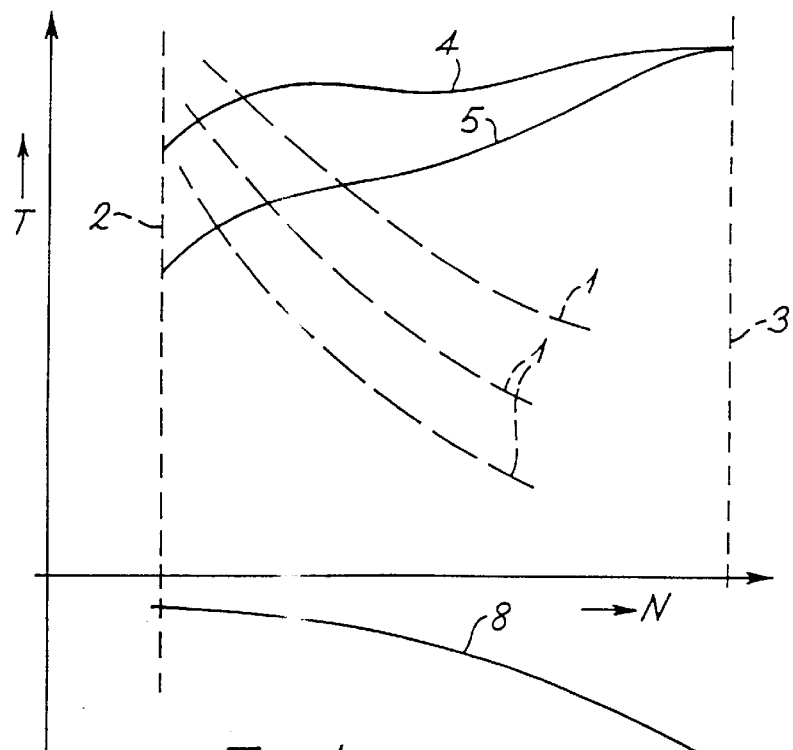
FIG. 1 is a graph of engine torque versus engine speed and indicates a desired performance map function.
Figure 2:
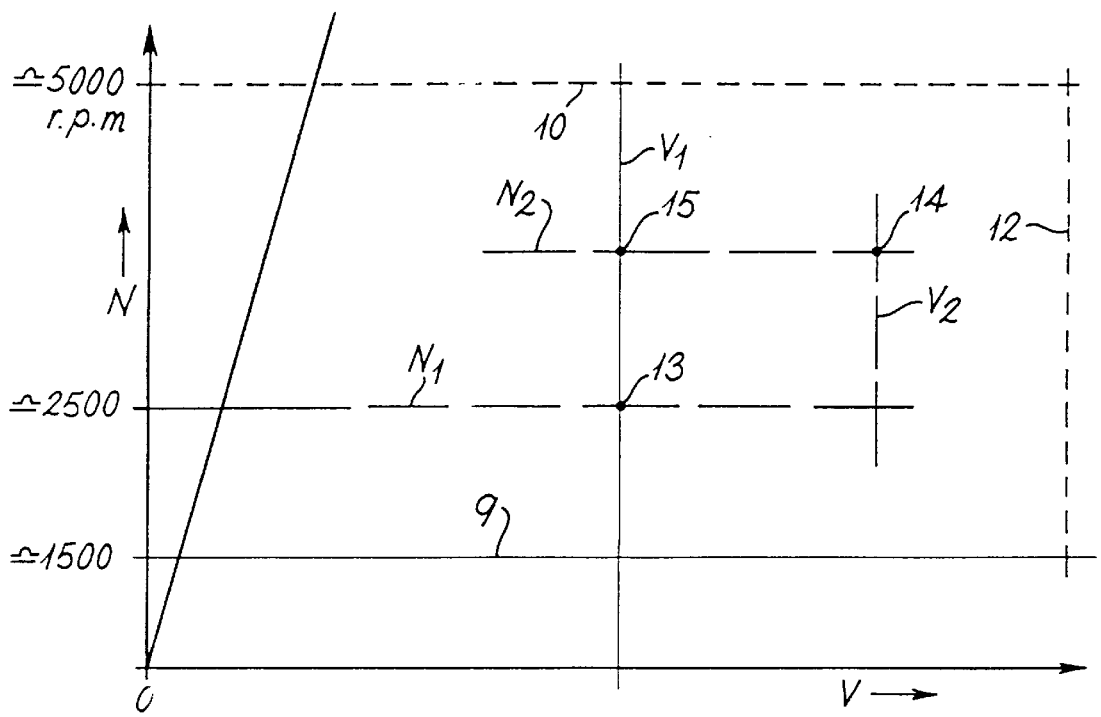
FIG. 2 is a graph of engine speed, N, verses vehicle speed, V, and indicates an effective conventional range within which a vehicle is capable of working.

The graph of FIG. 2 illustrates the typical correlation of engine speed N (y-axis) and vehicle speed V (x-axis) in an automotive vehicle driveline where the engine is controlled as indicated in FIG. 1, and where the driven wheels of the vehicle are the final drive. Lines 9 and 10 correspond to ordinates 2 and 3 of FIG. 1, and the sloping linear function 11 (which passes through the origin 0) corresponds with first gear ratio in a typical fixed-ratio transmission and thus defines the effective minimum values of N and V at which it is judged desirable for the driveline to work in practice. Ordinate 12 marks the maximum safe value of V. The effective "area" within which the driveline is capable of working is therefore bounded by lines 9, 11, 10 and 12.

Assume that the vehicle has been travelling in steady state at a vehicle speed $V_1$ and engine speed $N_1$ indicated by the intersection of the two lines at point 13. Assume now that while other variables remain unchanged, the driver wishes to call for greater road speed. He does so by depressing the accelerator pedal and so demanding greater engine speed, say $N_2$. The typical response of a known driveline, programmed to operate the engine to a control line 5 as shown in FIG. 1, has been to reach a final stable state of engine speed $N_2$ and vehicle speed $V_2$ (point 14) in two stages. Firstly by "kickdown", that is to say by causing engine speed to rise very quickly to $N_2$ at point 15. Then secondly by "upshift"—that is to say, change of transmission ratio at constant engine speed—to move from point 15 to 14. While efficient, such a change can be disconcerting to drivers, especially those who are used to the response of typical manual and automatic transmissions containing a number of fixed ratios. With such known transmissions, the driver knows that rises in engine and road speeds go together, in any single ratio. The note of the engine is a reassuring guide to vehicle speed, and to the rate of change of that speed However, when the performance of the vehicle of FIG. 2 moves between points 13 and 14, the message to the driver is less clear. Between points 13 and 14 the engine note rises sharply, but vehicle speed V does not change. Between points 15 and 14 the vehicle speed changes, but the constant engine note suggests otherwise. At no time, during the transition from 13 to 14, do acceleration and engine note correlate in a way familiar to a conventional driver.

Figure 3:
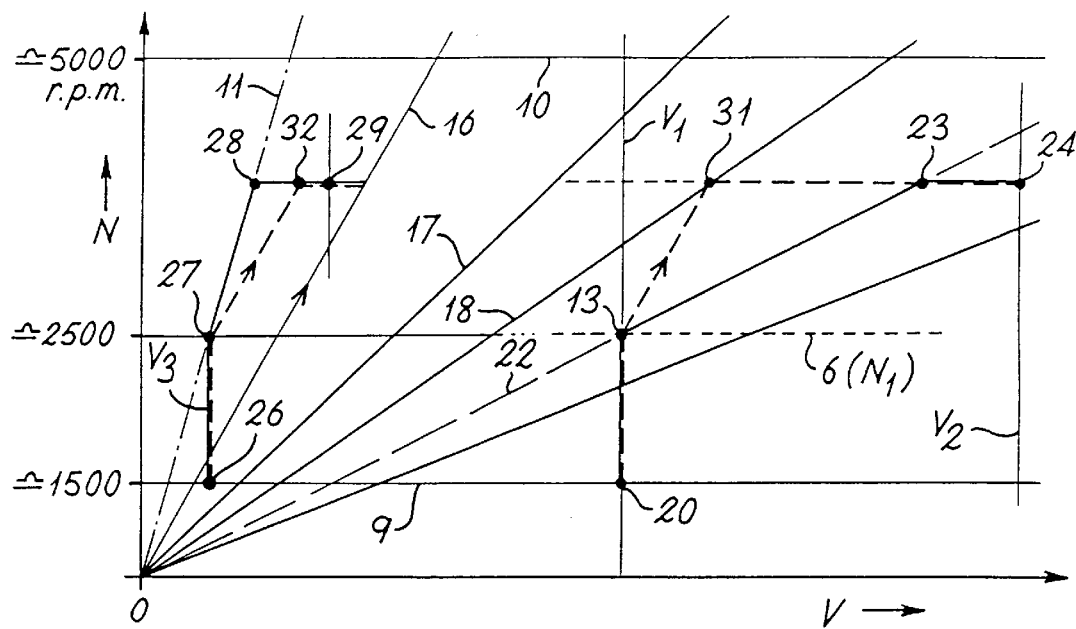
FIG. 3 is also a graph of engine speed, N, verses vehicle speed, V, but illustrates two modes of operation according to the invention.
Figure 4:
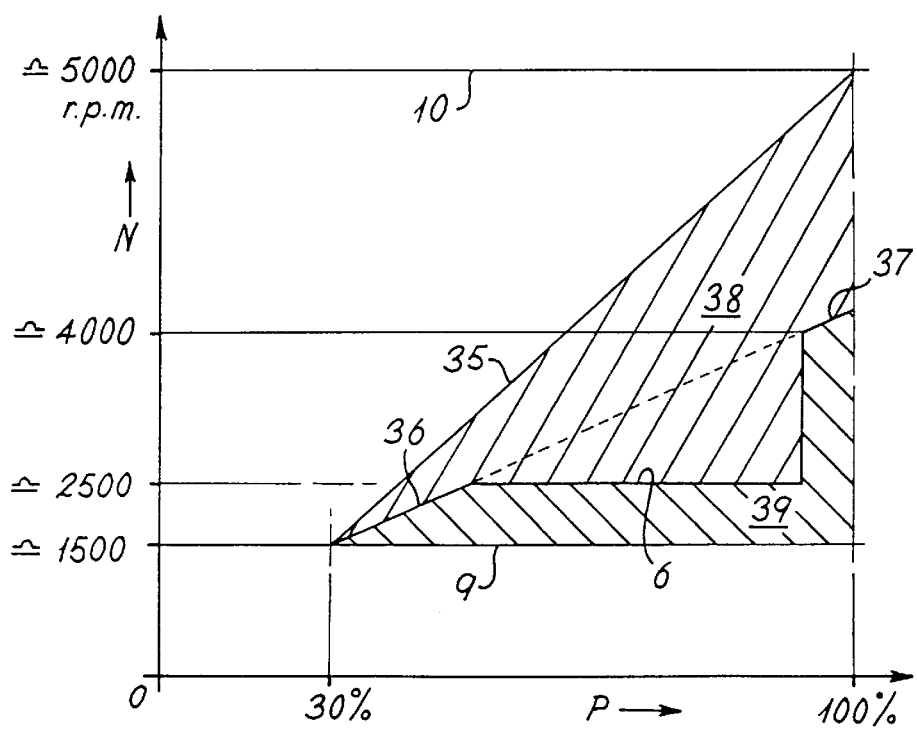
FIG. 4 is a graph correlating engine speed, N, with accelerator position, P.

The present invention aims to modify the mutual control of the engine and CVT so that although the engine can still operate to an optimum-efficiency control line like item 5 in FIG. 1, during at least part of the acceleration following a pedal depression (and in reverse, the deceleration following a relaxation) the engine note and the acceleration are correlated in a manner more familiar to a driver used to conventional manuals and automatics. The invention is defined by the claims, the contents of which are to be read as included within the disclosure of this specification. In particular the invention includes methods and apparatus as described by way of example with reference to the following further figures of the accompanying drawings, in which:

FIG. 3 is generally similar to FIG. 2, but illustrates two modes of operating according to the invention, and FIG. 4 is a further graph correlating engine speed N with accelerator pedal position P.

Figure 5:
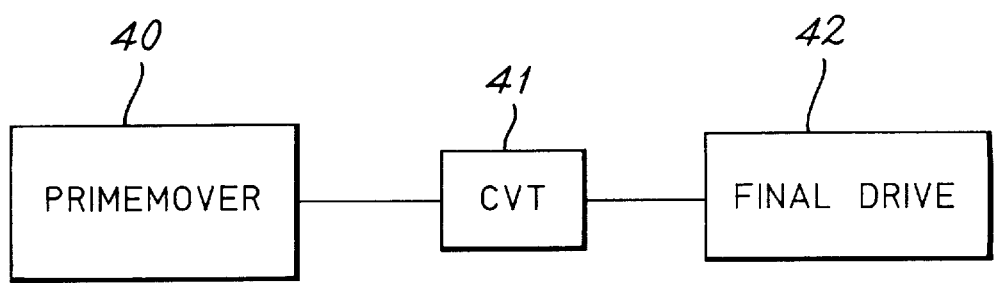
FIG. 5 is a block diagram of the driveline which includes a prime mover, a CVT and a final drive.

FIG. 5 is a block diagram of the driveline apparatus 43 comprising a prime mover 40, a CVT 41 and a final drive 42.

FIG. 2 included line 11, indicative of the ratio (e.g. 5 mph vehicle speed per 1000 rpm engine revolution) of a typical first forward gear in a conventional fixed-ratio automobile transmission. Because zero vehicle speed correlates with zero engine rpm in any such fixed ratio, line 11 passes through origin 0. Line 11 is repeated in FIG. 3, as is line 16 indicative of the ratio (e.g. 10 mph/1000 rpm) both of a typical fixed ratio second gear, and also of a typical synchronous ratio—that is to say, the ratio where change takes place between first and second regimes—in a two regime CVT of the toroidal race or other type. FIG. 3 also includes further lines 17–19, indicative of typical fixed ratios—e.g. 20, 30 and 40 mph per 1000 rpm respectively—of third, fourth and fifth forward gears in fixed-ratio transmissions.

Assume that a vehicle, fitted with a driveline according to the invention, is travelling in steady state as indicated by point 20. That is to say, vehicle speed is $V_1$ (as at 13 and 15 in FIG. 2) and the engine is running at its minimum permitted speed (say 1500 rpm) as indicated by line 9. The driver now depresses the accelerator pedal, to a degree which the driveline is programmed to interpret as demanding a engine speed corresponding to $N_2$ (as at points 15 and 14 in FIG. 2). According to one mode of operation of the present invention the driveline responds to the driver's demand in three stages, as follows. Firstly a rapid rise ("kickdown") in engine speed to a value (referred to in the claims as "engage speed"), predetermined and built into the control system as the lowest speed at which the engine should be running at the beginning of a period of substantial acceleration. In a typical engine as shown in FIGS. 2 and 3, capable of running between an idling speed of 1500 rpm. and a maximum speed of say 5000 rpm, this speed could for example be 2500 rpm. In FIG. 3 the "engage speed" is the same speed $N_1$ as in FIG. 2 and is represented by line 6, and at the end of the first of the three stages of response point 13 has therefore been reached.

Function 22, drawn through point 13 and the origin 0, is now pre-chosen by the control system as an ideal, equivalent fixed-ratio for the CVT and engine of the driveline to follow in the second stage of the response, during which the driveline moves from point 13 on line 6 to point 23 when engine speed $N_2$ is attained. During this second stage of the acceleration response the driveline is therefore programmed to respond as if in fixed ratio, so that the driver "feels" the acceleration of the vehicle just as he would if the driveline had the fixed ratio represented by function 22. Once the demanded engine speed $N_2$ is reached at point 23, the third stage of the response begins. During this the engine speed remains at $V_2$, so that the engine note does not change. Any further rise in vehicle speed to a final value (e.g. to point 24, value $V_2$ as in FIG. 2), at which the force exerted on the vehicle by the engine is matched by the forces resisting the vehicle's motion will be accommodated by ratio change within the CVT.

A possible drawback of the embodiment of the invention shown in FIG. 3 and so far described is that for the complete acceleration (between points 20 and 24) shown in the figure the "fixed-ratio" second stage, between points 13 and 23, may be unduly prolonged because of the relatively gentle slope of function 22. Conversely, if acceleration of vehicle speed had been demanded from velocity $V_3$ (point 26) to $V_4$ (point 29) at the left-hand side of the graph, by way of a "fixed-ratio" second stage 27, 28 coinciding with the "first ratio" line 11, that stage would have been relatively brief because of the steepness of the ratio line. In the alternative embodiment of the invention also shown in FIG. 3, such extremes are avoided by programming the driveline so that during the second, "fixed ratio" stage of the response to a driver's demand for acceleration, vehicle and engine speeds rise together at a rate parallel to a chosen fixed ratio line—in this case, the line 16 representing the typical synchronous ratio of a two-regime toroidal-race CVT, or the second forward gear of a typical fixed-ratio transmission. Now, as shown in broken lines, the acceleration of the vehicle from speed $V_1$ at point 20, to speed $V_2$ at point 24, is by way of points 13 and 31 instead of 13 and 23, so that the second stage of the response is briefer than before but the third stage longer. Conversely for the acceleration from the $V_3$ to $V_4$ the second and third stages are now 27–32 and 32–29 instead of 27–28 and 28–29, so that the second stage is longer than before and the third stage briefer.

In practice the three-stage response to a demand for acceleration, of a driveline according to the invention, will probably be fractionally slower than the known two-stage response described with reference to FIG. 2. However that possible small increase in total time will be offset by the driver being able to sense the response to his demand in a way that has not been customary hitherto in CVT drivelines. With relation to FIG. 3, it should be noted that while such parameters as "engage speed", "limit speed" and the various notional ratios have all be shown for convenience as straight-line functions, it is within the scope of the invention and obviously within the capabilities of programmed driveline control that non-straight-line functions could be substituted. In particular, the value of "engage speed" could easily vary over the total range of vehicle speed.

FIG. 4 interprets the operation of the invention, as already described with reference to FIG. 3, in relation to accelerator pedal depression P (x-axis). As before, the y-axis represents demanded engine speed N. As the left-hand section of FIG. 4 indicates, a typical driveline according to the invention may be programmed so that the three-stage reaction to a driver's demand for acceleration does not begin until the pedal is depressed at least 30%. Thereafter a "limit speed" 35, of any value between idling speed 9 and maximum engine speed 10 may be demanded. In FIGS. 2 and 3 $N_2$ was the single example shown of such a "limit speed". As FIG. 4 indicates, the "engage speed" value may for instance rise steadily (slope 36) to a range or value which it holds over the majority of the working range of the driveline—e.g. the value of 2500 rpm, line 6 in FIG. 3. However, as shown at the right-hand side of FIG. 4, the driveline may conveniently be controlled so as to raise the engage speed to a much higher value 37, so that the second, "fixed ratio" stage of the response starts on a much higher engine speed if the accelerator pedal is depressed almost fully, for instance in response to an emergency. In FIG. 4 the hatched part 38 of the graph indicates the "area" over which the second stage of the response can take place, and the hatched part 39 the area over which the first "kickdown" stage takes place, during which engine speed rises rapidly, but there is no substantial change in vehicle speed. As already described, for each acceleration demand, the third stage of the response begins when engine speed reaches "limit speed".

It is claimed:

1. A method of controlling a vehicular driveline including an engine coupled to a continuously-variable-ratio transmission, said continuously-variable-ratio transmission having a ratio range and being coupled to a final drive, in which over a working range of engine speed the engine is constrained to work to a performance map which correlates each value of engine speed with a particular value of engine torque, whereby a demand for an increase in engine speed by a driver initiates said method of controlling the vehicular driveline; and said method of controlling the vehicular driveline comprising the steps of:

Step 1: increasing an initial engine speed to a predetermined engage speed without any substantial rise in a final drive speed;

Step 2: increasing both the engine speed and the drive speed according to a predetermined function until the engine speed reaches a selected limit which is commensurate with the demand by the driver; and Step 3: maintaining the engine speed at the selected engine speed limit despite a further change in the final drive speed;

wherein said ratio range of the continuously-variable-ratio transmission is extended by providing two regimes of operation with a synchronous ratio provided between those regimes, and said predetermined function is represented graphically as a straight line with a slope which corresponds to a slope of the synchronous ratio.

2. A method according to claim 1 further comprising the step of representing said predetermined function on a graphical plot of engine speed versus vehicle speed as a line with a substantially constant slope irrespective of the initial engine speed and the selected engine speed limit.

3. A method according to claim 1 further comprising the step of relating the engage speed to the demand by the driver whereby a higher demand by the driver triggers an increased value of the engage speed.

4. A vehicular driveline comprising an engine being connected to a continuously-variable-ratio transmission, said continuously-variable-ratio transmission having a ratio range and being coupled to a final drive, means for constraining said driveline to work to a performance map which correlates each value of engine speed with a particular value of engine torque, whereby a demand for an increase in engine speed by a driver initiates the following:

means for quickly increasing an initial engine speed to a predetermined engage speed without any substantial rise in a final drive speed;

means for increasing both the engine speed and the drive speed according to a predetermined function until the engine speed reaches a selected limit which is commensurate with the demand by the driver; and means for maintaining the engine speed at the selected engine speed limit despite a further change in the final drive speed;

wherein said ratio range of the continuously-variable-ratio transmission is extended by providing two regimes of operation with a synchronous ratio provided between those regimes, and said predetermined function is represented graphically as a straight line with a slope which corresponds to a slope of the synchronous ratio.

5. A vehicular driveline according to claim 4 wherein said predetermined function comprises a graphical plot of engine speed versus vehicle speed as a line with a substantially constant slope irrespective of the initial engine speed and the selected engine speed limit.

6. A vehicular driveline according to claim 4 wherein said vehicular driveline includes means for relating the engage speed to the demand by the driver whereby a higher demand by the driver triggers an increased value of the engage speed.

\* \* \* \* \*